(12) United States Patent
Motohashi

(10) Patent No.: US 6,944,483 B1
(45) Date of Patent: Sep. 13, 2005

(54) PORTABLE RADIO TERMINAL WITH INFRARED COMMUNICATION FUNCTION AND COMMUNICATION METHOD FOR PORTABLE RADIO TERMINAL

(75) Inventor: Teruyuki Motohashi, Tokyo (JP)

(73) Assignee: NEC Corporation, Tokyo (JP)

( * ) Notice: Subject to any disclaimer, the term of this patent is extended or adjusted under 35 U.S.C. 154(b) by 752 days.

(21) Appl. No.: 09/643,765

(22) Filed: Aug. 23, 2000

(30) Foreign Application Priority Data

Aug. 23, 1999 (JP) .................................. 11/235009

(51) Int. Cl.[7] ........................... H04B 1/38; H04B 10/00
(52) U.S. Cl. ................... 455/574; 455/421; 455/127.5; 455/553.1; 455/127.4; 398/120; 398/115
(58) Field of Search ................... 398/120, 118, 115; 455/127.1, 127.5, 553.1, 574, 557, 558, 117, 455/420, 556, 552.1, 572, 556.1, 556.2, 41.2, 455/421, 127.4; 324/705, 713, 502; 375/316; 320/128, 104

(56) References Cited

U.S. PATENT DOCUMENTS

| | | | | |
|---|---|---|---|---|
| 5,636,264 A | * | 6/1997 | Sulavuori et al. | 398/41 |
| 5,835,862 A | * | 11/1998 | Nykanen et al. | 455/558 |
| 5,880,867 A | | 3/1999 | Ronald | 398/119 |
| 6,014,030 A | * | 1/2000 | Smith et al. | 324/705 |
| 6,031,825 A | * | 2/2000 | Kaikuranta et al. | 370/296 |
| 6,081,558 A | * | 6/2000 | North | 375/316 |
| 6,223,029 B1 | * | 4/2001 | Stenman et al. | 455/420 |
| 6,230,214 B1 | * | 5/2001 | Liukkonen et al. | 710/1 |
| 6,272,325 B1 | * | 8/2001 | Wiedeman et al. | 455/117 |
| 6,377,429 B1 | * | 4/2002 | Descombes | 361/93.8 |
| 6,459,175 B1 | * | 10/2002 | Potega | 307/149 |
| 6,483,622 B1 | * | 11/2002 | Motohashi | 398/120 |
| 6,525,854 B1 | * | 2/2003 | Takahashi et al. | 398/115 |

FOREIGN PATENT DOCUMENTS

| | | | | |
|---|---|---|---|---|
| EP | 0 465 444 | | 1/1992 | ............ H04B 7/26 |
| JP | 9-312606 A | | 12/1997 | ............ H04B 7/26 |
| JP | 10-56673 A | | 2/1998 | ............ H04Q 7/38 |
| JP | 11-196049 A | | 7/1999 | ............ H04B 7/26 |
| JP | 11-252017 | * | 9/1999 | .......... H04B 10/22 |

* cited by examiner

*Primary Examiner*—Rafael Perez-Gutierrez
(74) *Attorney, Agent, or Firm*—Sughrue Mion, PLLC

(57) ABSTRACT

A portable radio terminal with an infrared communication function prevents consumption power from increasing when a radio communication function and an infrared communication function are used at a same time. A radio communication function section is judged whether in radio communication or not, and a driving current of an light emitting element in an infrared communication function section. The driving current of the light emitting element for an infrared communication is controlled in accordance with an operation of the radio communication function section, therefore, it is possible to loosen a condition for enabling infrared communication. As to restrictions for outputs from light emitting elements, a driving current of a light emitting element is controlled or plural light emitting elements having respective outputs are selectively driven.

14 Claims, 6 Drawing Sheets

PORTABLE RADIO TERMINAL WITH INFRARED COMMUNICATION FUNCTION AND COMMUNICATION METHOD FOR PORTABLE RADIO TERMINAL

BACKGROUND OF THE INVENTION

1. Field of the Invention

The present invention relates to a portable radio terminal with an infrared communication function and a communication method for the portable radio terminal with the infrared communication function and more particularly to the portable radio terminal with the infrared communication function and the communication method for the portable radio-terminal with the infrared communication function for power control when infrared communication and radio communication are executed simultaneously.

2. Description of the Related Art

A radio communication function transmits radio waves in order to carry out radio communications. Transmission power to transmit radio waves generally requires a large consumption of electric current (for example, an RCR STD-27 digital radiophone system, such as a PDC (Personal Digital Cellular) system, is used as a radio communication system).

An infrared communication function also requires a large consumption of electric current in order to make an emitting element emit.

Therefore, in a case that an infrared communication function is provided in a radio portable information terminal using a battery as a power source, when the battery voltage drops, it becomes impossible to use the radio communication function and the infrared communication function simultaneously.

A terminal is known, in which irrespective of the battery voltage, it is restricted to use the radio communication function and the infrared communication function simultaneously from the beginning in order to give a longer lifetime of the battery for the radio portable information terminal, and a battery capacity and a power source circuit are minimized.

In these known techniques, there are the following problems.

A first problem is that the radio communication function and the infrared communication function can not be used simultaneously. As its causes, the infrared communication function requires a large consumption electric current and a communicable distance of the infrared communication function is required to be kept at a constant distance or more.

A second problem is that a large battery capacity is required to use the radio communication function and the infrared communication function simultaneously and a battery becomes large in size. As its cause, both of the radio communication function and the infrared communication function require large consumption of electric current.

Therefore, it is desirable to control an increase of consumption electric of current when the radio communication function and the infrared communication function are executed simultaneously.

SUMMARY OF THE INVENTION

In view of the above, it is an object of the present invention to provide a portable radio terminal with an infrared communication function and a communication method therefore, capable of controlling an increase of electric current consumption when a radio communication function and the infrared communication function are executed simultaneously.

According to a first aspect of the present invention, there is provided a communication method for a portable radio terminal with an infrared communication function, the communication method including: a step of judging whether a radio communication function section is in radio communication or not; and a step of controlling a driving current of a light emitting element in an infrared communication function section in accordance with a judgment.

Also, a preferable mode is one wherein the driving current of the light emitting element in the infrared communication function section is controlled in accordance with a transmission power value of the radio communication function section.

According to a second aspect of the present invention, there is provided a communication method for a portable radio terminal with an infrared communication function, the communication method including: a step of judging whether a radio communication function section is in radio communication or not; and a step of selecting the infrared communication function among a plurality of infrared communication functions in accordance with a judgement.

In the foregoing second aspect, a preferable mode is one wherein the infrared communication function is selected among the plurality of infrared communication functions in accordance a transmission power value of the radio communication function section.

Also, a preferable mode is one wherein it is notified that a communicable distance of the infrared communication function is restricted.

According to a third aspect of the present invention, there is provided a portable radio terminal with an infrared communication function including: a radio communication function section; an infrared communication function section; and an information processing section for detecting a function state of the radio communication function section and for controlling an infrared output from the infrared communication function section.

Also, a preferable mode is one wherein the function state is a radio output of the radio communication function section, and the infrared output is controlled to be small when the radio output is larger.

Also, a preferable mode is one wherein the small infrared output corresponds to restricting a communicable distance of the infrared communication function.

As described above, the portable radio terminal with the infrared communication function and the communication method for the portable radio terminal of the invention provide four effects.

First, it is possible to use the infrared communication function though the radio communication function is in radio communication; because it is judged while in infrared communication whether it is in radio communication or not. When it is in radio communication, the driving current of the light emitting element is controlled and the driving current value is restricted.

Second, it is possible to extend battery lifetime because it is possible to select a driving current of the light emitting element in accordance with a transmission power value of the radio communication function section.

Third, it is possible to make necessary battery capacity and power circuits small because, when the infrared communication function and the radio communication function are operated at the same time, the driving current of the light emitting element in the infrared communication function section and the driving current value is restricted.

Fourth, a person having this terminal can know whether a communicable distance of the infrared communication is restricted or not because the restriction is notified to the person having the terminal while the driving current of the light emitting value is restricted.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Best modes for carrying out the present invention will be described in further detail using various embodiments with reference to the accompanying drawings.

First Embodiment

Figure 1:
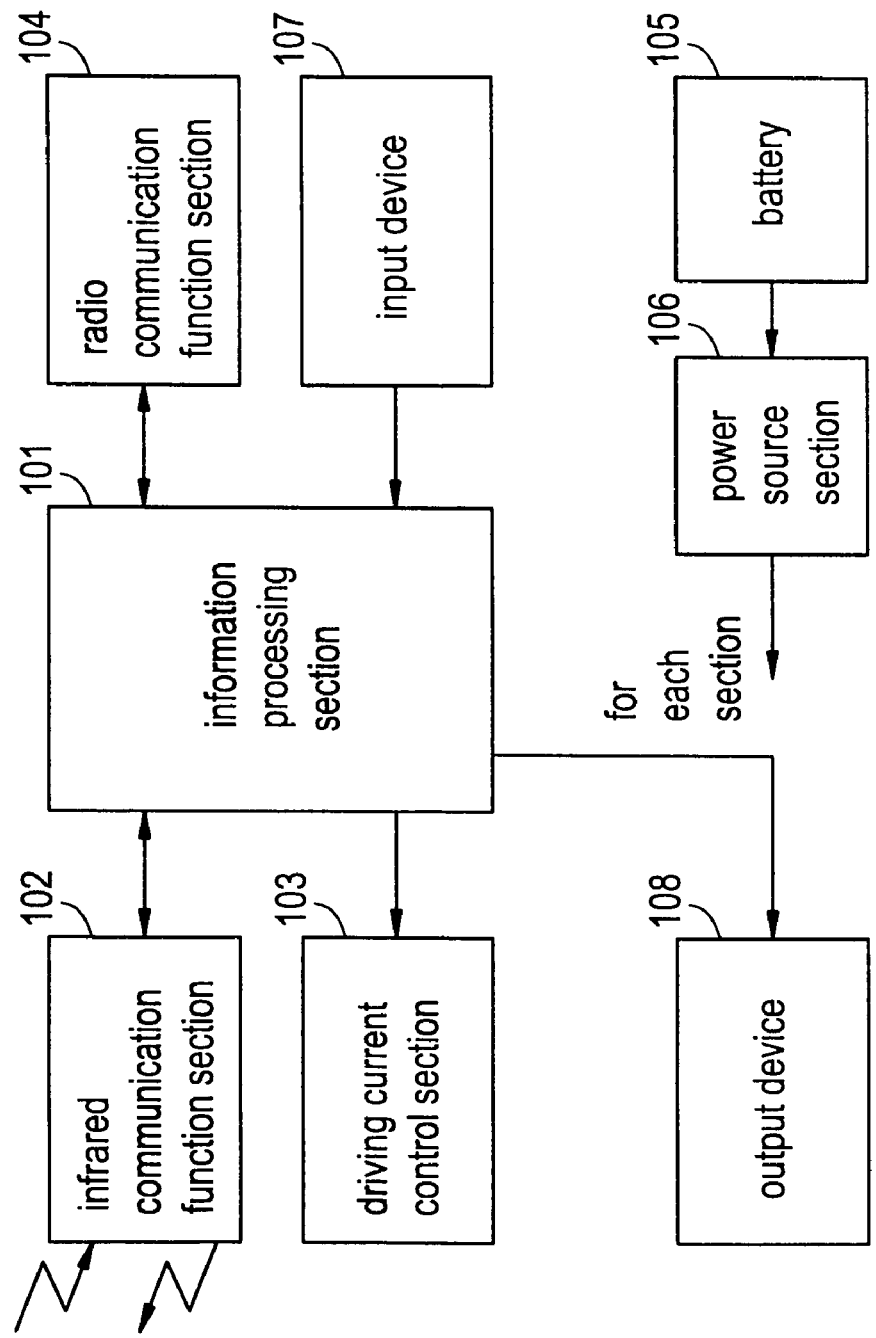
FIG. 1 is a block diagram showing a portable radio terminal with an infrared communication function according to a first embodiment of the present invention.

FIG. 1 is a block diagram showing a portable radio terminal with an infrared communication function according a first embodiment. As shown in FIG. 1, the portable radio terminal is provided with an information processing section 101, an infrared communication function section 102, a driving current control section 103, a radio communication function section 104, a battery 105, a power source section 106, an input device 107 and an output device 108.

The information processing section 101 operates by program control and is connected to the infrared communication function section 102 bidirectionally.

The infrared communication function section 102 is capable of infrared-communicating with another apparatus (not shown) with the infrared communication function.

The information processing section 101 is connected to the driving current control section 103.

The radio communication function section 104 capable of radio-communicating is connected to the infrared communication function section 102 bidirectionally.

The power source section 106 stabilizes a voltage of the battery 105 and distributes stabilized voltage to each section.

The input device 107 such as a keyboard is connected to the information processing section 101.

The information processing section 101 is connected to the output device 108 such as an LCD (Liquid Crystal Display).

Figure 2:
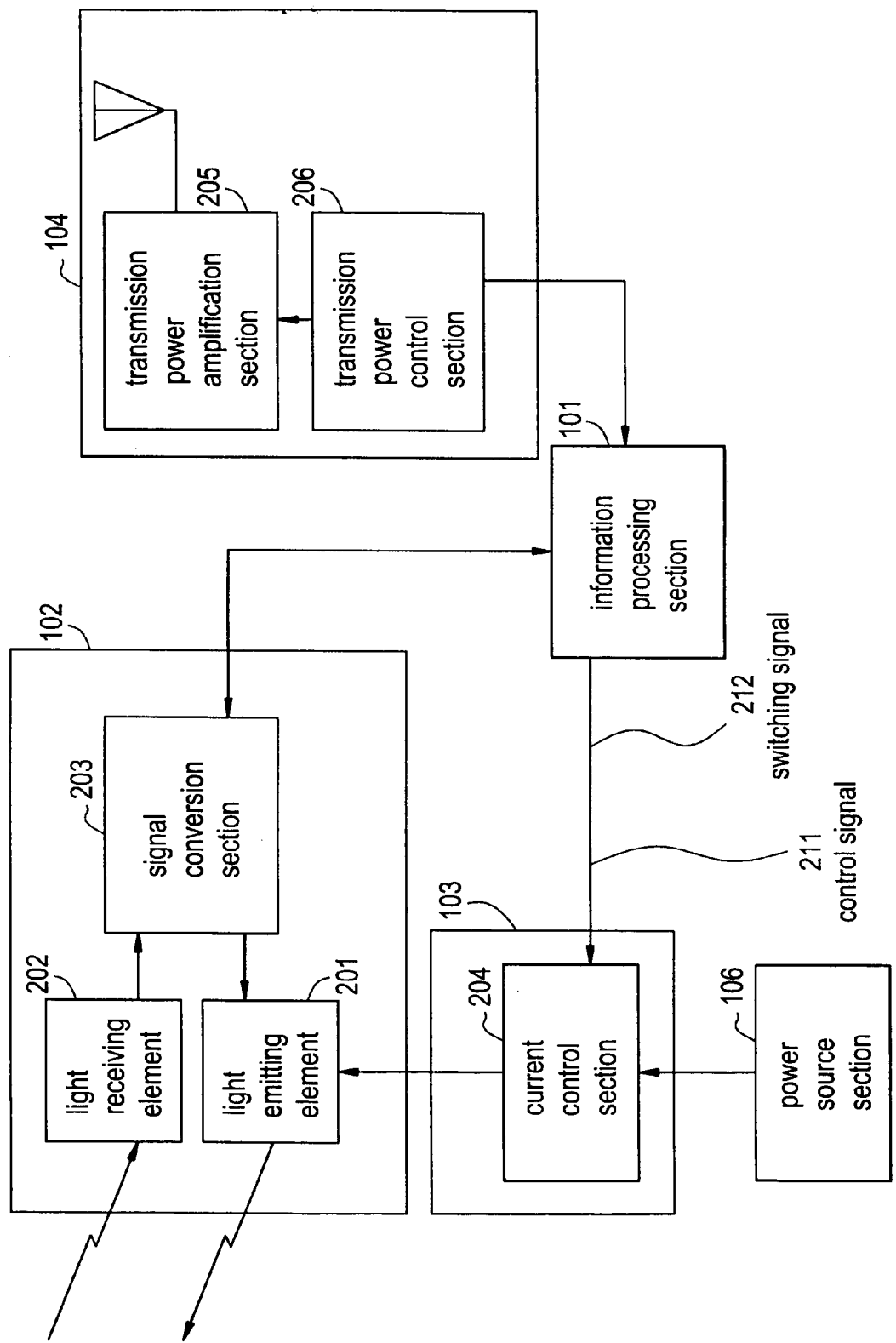
FIG. 2 is a circuit block diagram showing details of a part of FIG. 1.

The infrared communication function section 102, as shown in FIG. 2, is a light emitting element 201 such as an infrared LED (Light Emitting Diode) for emitting infrared signals, a light receiving element 202 such as a phototransistor for receiving infrared signals and a first signal conversion section 203 for coordinating a signal level between the light emitting element 201 and the information processing section 101 and a signal level between the light receiving element 202 and the information processing section 101.

The driving current control section 103, as shown in FIG. 2, is provided with a current control section 204 changing a driving current of the light emitting element 201 in the infrared communication function section 102. The current control section 204 can set a driving current value to a first current value, a second current value and a third current value.

The radio communication function section 104 is provided with a transmission power amplification section 205 and a transmission power control section 206. The transmission power control section 206 controls and optimizes a transmission power in accordance with a distance from a base station and an usage situation.

The information processing section 101 is provided with a first control section (not shown) for outputting a control signal 211 controlling a driving current of the light emitting element 201 to the driving current control section 103 when the radio communication function section 104 is in radio communication, and a second control section (not shown) for outputting a switching signal 212 switching control levels of the driving current of the light emitting element 201.

Figure 4:
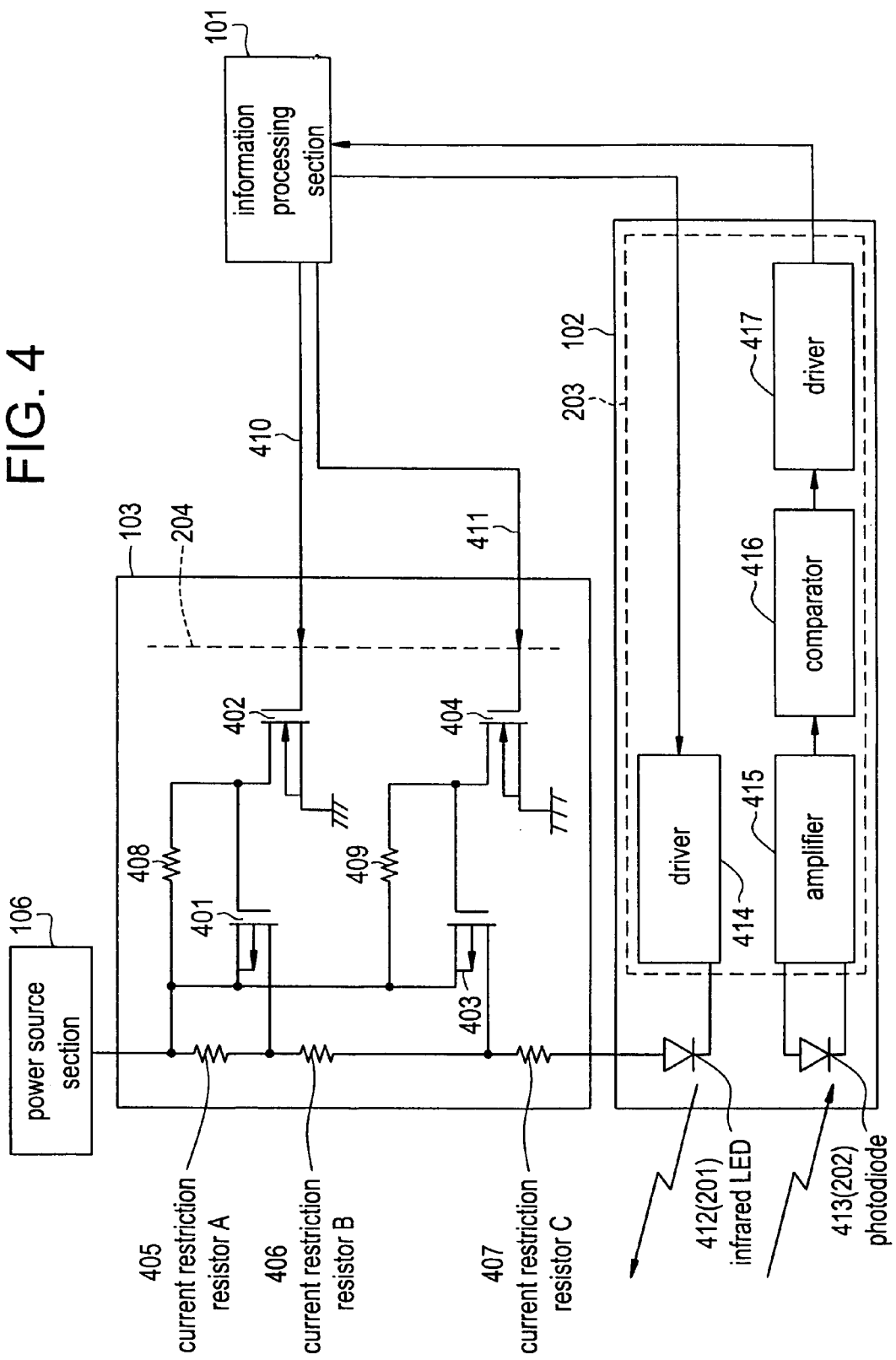
FIG. 4 is a circuit diagram showing further details of the portable radio-terminal with the infrared communication function according to a first embodiment of the present invention.

FIG. 4 shows a concrete circuit diagram of the block diagrams shown in FIGS. 1 and 2.

The light emitting element 201 is an infrared LED (Light Emitting Diode) 412, and the light receiving element 202 is a photodiode 413.

The first signal conversion section 203 is provided with a driver 414 for driving the infrared LED 412 and an amplifier 415 for amplifying electric signals from the photodiode 413.

Analog electric signals amplified by the amplifier 415 are converted into digital signals by a comparator 416.

A driver 417 coincides the digital signals with signals of the information processing section 101 as to a signal level.

The current control section 204 in the driving current control section 103 is provided with a current restriction resistor A 405, a current restriction resistor B 406 and a current restriction resistor C 407 for restricting the driving current of the infrared LED 412, a first FET (Field Effect Transistor) 401 to short-circuit the current restriction resistor A 405, a second FET 402 for driving the first FET 401, a third FET 403 to short-circuit the current restriction resistor A 405 and the current restriction resistor B 406, a fourth FET 404 for driving the third FET 403, a pull-up resistor A 408 and a pull-up resistor B 409.

Figure 3:
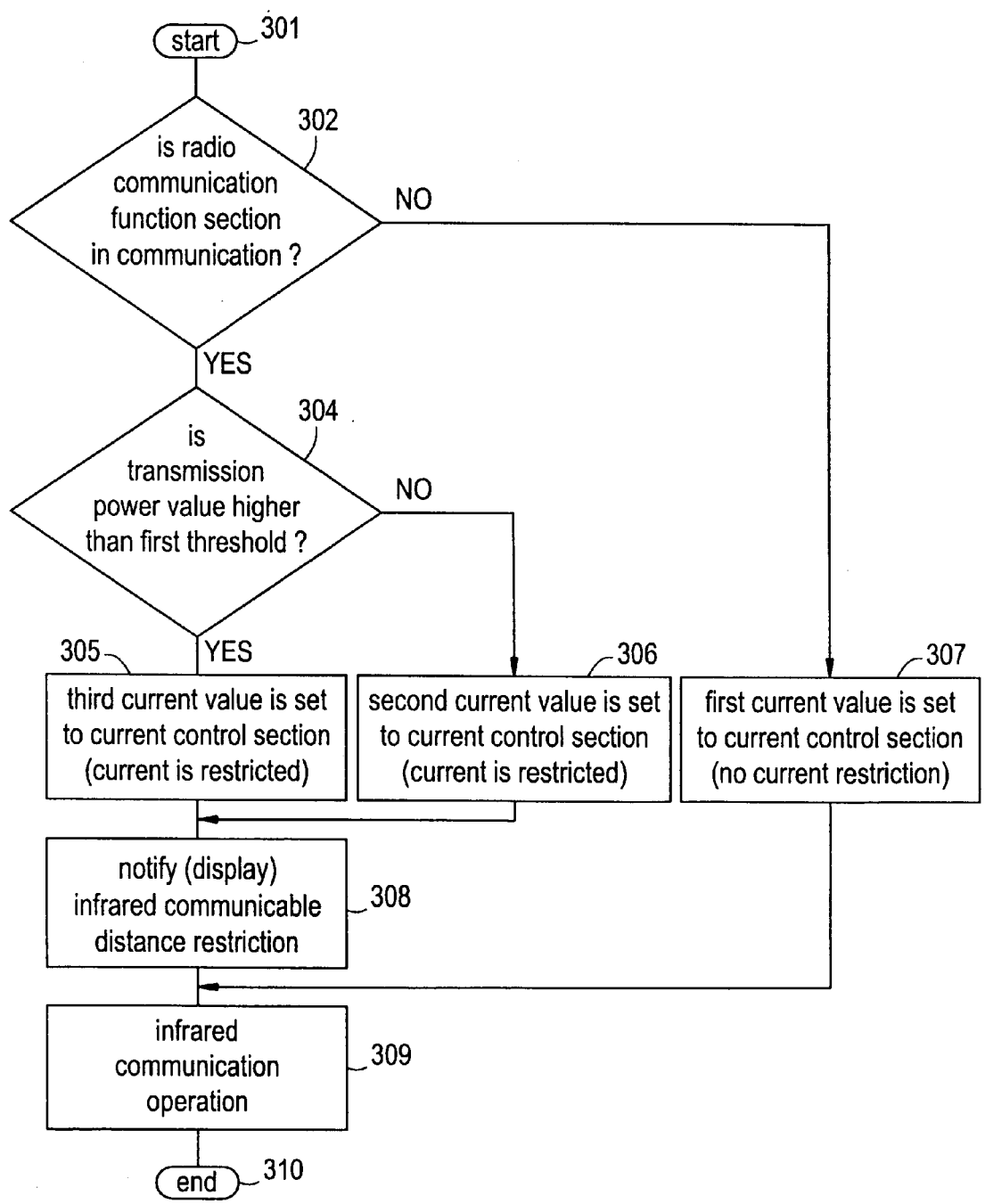
FIG. 3 is an operational flowchart showing a communication method of the portable radio terminal with the infrared communication function according to a first embodiment of the present invention.

FIG. 3 shows an operation according to the first embodiment of the present invention.

When starting the infrared communication function is requested to the information processing section 101 by the input device 107 (Step S301), the information processing section 101 judges whether the radio communication function section 104 is in radio communication or not before executing an infrared communication operation (Step S302). When the radio communication function section 104 is not in radio communication, the information processing section 101 sets a driving current value of the light emitting element 201 in the infrared communication function section 102 to a first current value I-1 for the current control section 204 in the driving current control section 103 (Step S307). The first current value I-1 gives no restriction to the driving current of the light emitting element 201.

When the radio communication function section 104 is in radio communication, the information processing section 101 also judges a transmission power value of the radio communication function section 104 in accordance with information from the transmission power control section 206. When the transmission power value is lower than a predetermined first threshold (Step S304: No), the information processing section 101 sets a driving current value of the light emitting element 201 in the infrared communication function section 102 to a second current value I-2 for the current control section 204 in the driving current control section 103 (Step S306). The second current value I-2 restricts the driving current of the light emitting element 201. When the transmission power value is higher than the predetermined first threshold (Step S304: YES), the information processing section 101 sets a driving current value of the light emitting element 201 in the infrared communication function section 102 to a third current value I-3 for the current control section 204 in the driving current control section 103 (Step S305). The third current value I-3 further restricts the driving current of the light emitting element 201 more than the second current value I-2.

With these current restrictions, a consumption power of the light emitting element 201 is deduced and an arrival distance of infrared emitted from the light emitting element 201 is restricted. The output device 108 indicates that a communicable distance of the infrared communication is restricted in this way (Step S308). As above described, after the driving current of the light emitting element 201 is determined based on battery voltage, the infrared communication operation is executed (Step S309), and the infrared communication operation is finished (Step S310).

Next, concrete descriptions will be given of the operation with the circuit diagrams (FIGS. 1, 2 and 4) and the operational flowchart (FIG. 3).

When not in radio communication (Step S302: No), the information processing section 101 outputs a signal of a HI (high) level to a control line 411 and outputs a signal of a LOW level to a control line 410 for the current control section 204 in the driving current control 103. With these outputs, the fourth FET 404 is turned ON and the third FET 403 is also turned ON. Both sides of the current restriction resistor A 405 and the current restriction resistor B 406 are short-circuited, the driving current of the infrared LED 412 is restricted by the resistance value of the current restriction resistor C 407, and the first current value I-1 can be set.

In radio communication (Step S302: Yes), when a transmission power value is lower than a predetermined first threshold (Step S304: No), the information processing section 101 outputs a signal of a HI (high) level to the control line 410 and outputs a signal of a LOW level to the control line 411 for the current control section 204 in the driving current control 103. The second FET 402 is turned ON and the first FET 401 is also turned ON. Therefore, both sides of only the current restriction resistor A 405 are short-circuited, the driving current of the infrared LED 412 is restricted by the total resistance value of the current restriction resistor B 406 and the current restriction resistor C 407, and the second current value I-2 can be set.

In radio communication (Step S302: Yes), when a transmission power value is higher than a first predetermined threshold (Step S304: Yes), the information processing section 101 outputs signals of LOW levels to a control line 410 and to a control line 411 for the current control section 204 in the driving current control section 103. All of FETs are turned OFF, the driving current of the infrared LED 412 is restricted by the total resistance value of the current restriction resistor A 405, the current restriction resistor B 406 and the current restriction resistor C 407, and the second-current value I-3 can be set.

In the first embodiment, the explanations are given in a case that one threshold is used for judgment of the transmission power value of the radio communication section and two restricted driving current values of the light emitting element are used. However, two and more thresholds may be used to judge detected results of transmission power values and three and more driving current values of light emitting elements may be used in accordance with the number of thresholds.

In the first embodiment, a case is described in that the radio communication function section has a function to control a transmission power, however, though there is no function controlling the transmission power, the driving current of the light emitting element is restricted only whether in radio communication or not, and thereby similar effects can be obtained.

Second Embodiment

Figure 5:
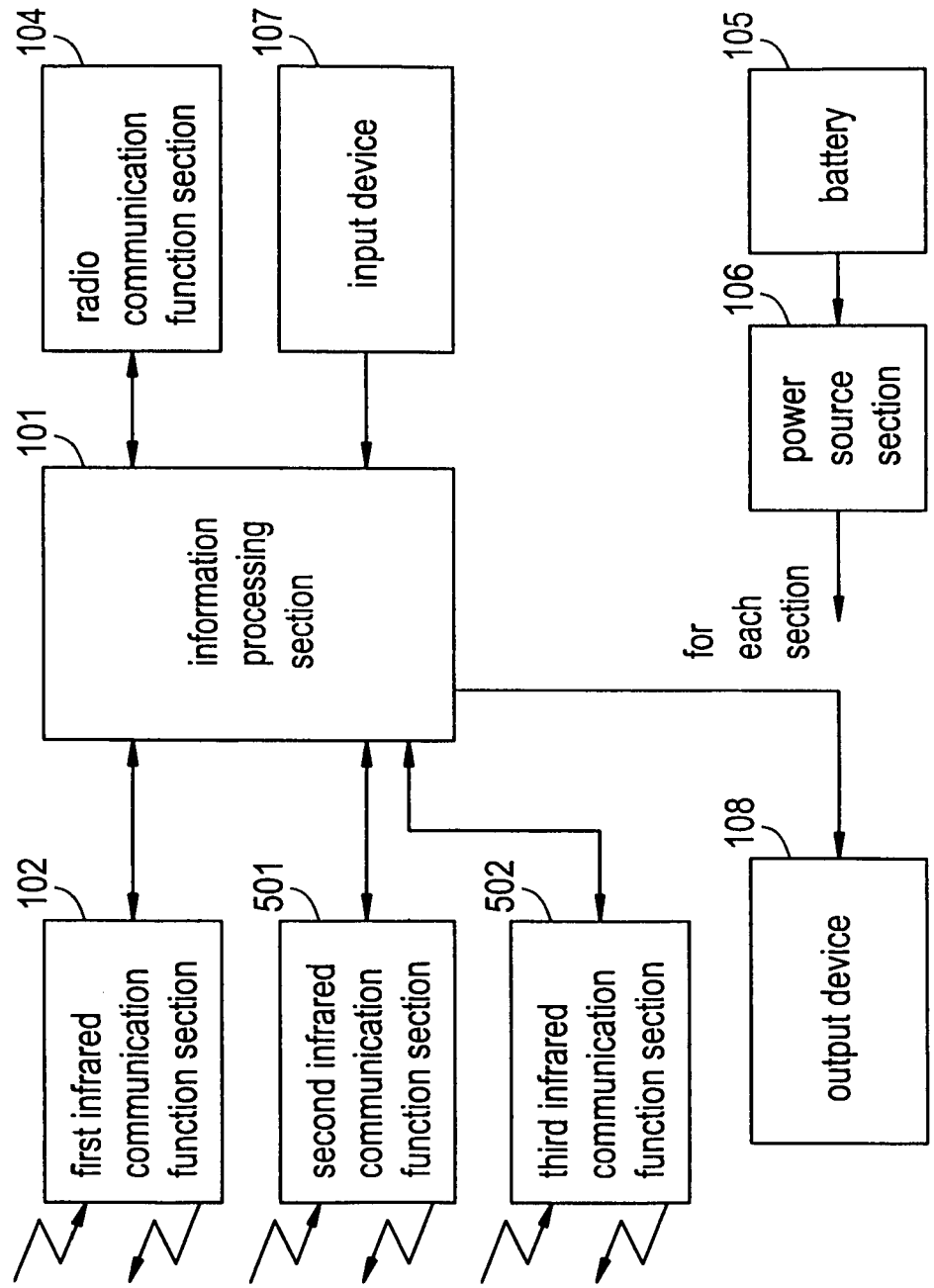
FIG. 5 is a block diagram showing a portable radio terminal with an infrared communication function according to a second embodiment of the present invention.

A second embodiment according to the present invention will be described. FIG. 5 shows a portable radio terminal with an infrared communication function according to the second embodiment of the present invention.

The portable radio terminal with the infrared communication function according to the second embodiment is different from that of the first embodiment in being provided with a second infrared communication function section 501 and a third infrared communication function section 502 instead of a driving current control section 103.

A driving current of a light emitting element (not shown) in the second infrared communication function section 501 is set to a value lower than a driving current of a light emitting element in the first infrared communication function section 102.

Further, a driving current of a light emitting element (not shown) in the third infrared communication function section 502 is set to a value lower than the driving current of the light emitting element in the second infrared communication function section 501.

Figure 6:
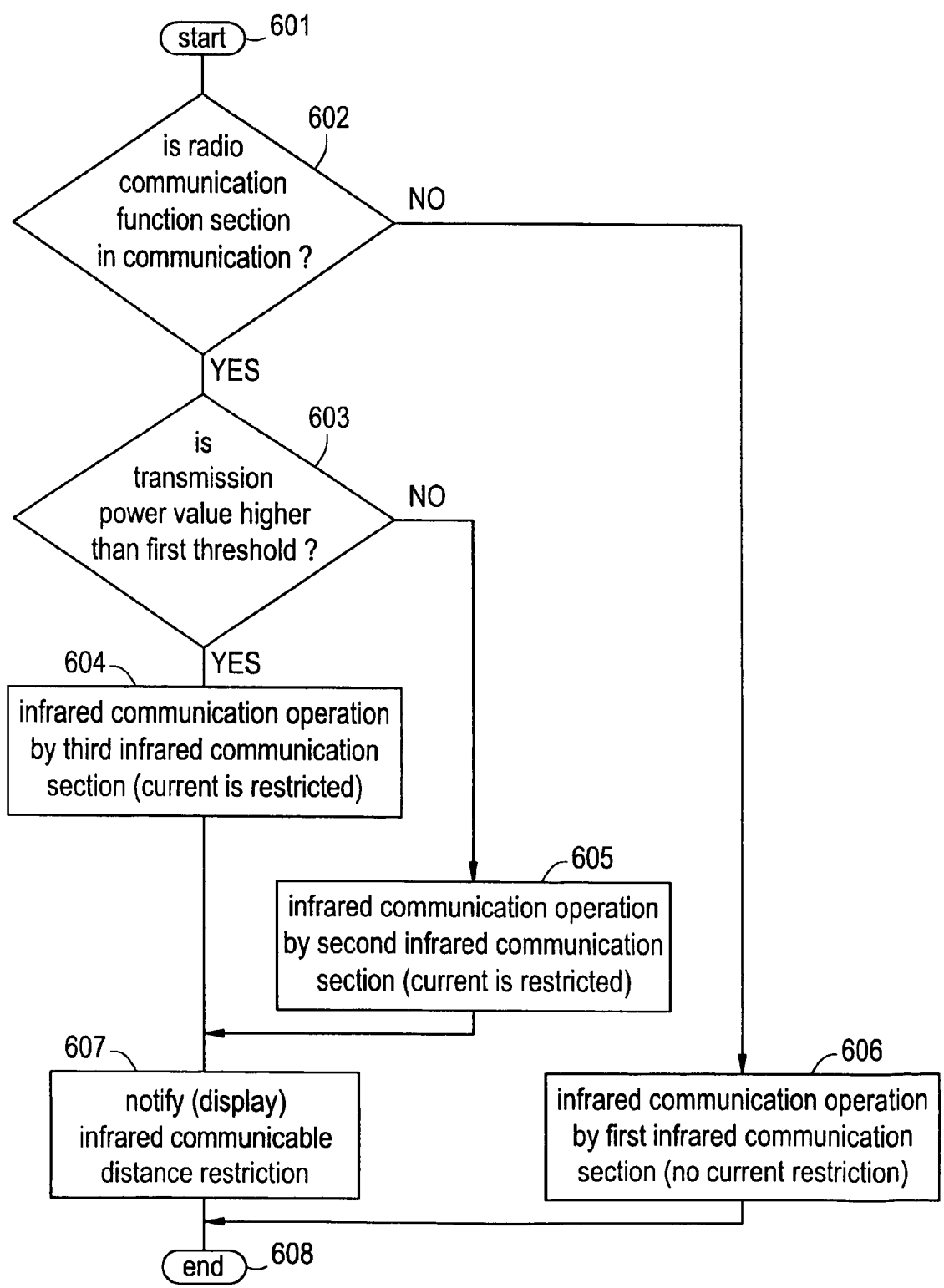
FIG. 6 is an operational flowchart showing a communication method of the portable radio terminal with the infrared communication function according to a second embodiment of the present invention.

FIG. 6 shows an operation of the second embodiment.

When starting the infrared communication function is requested to an information processing section 101 by an input device 107 (Step S601), the information processing section 101 judges whether a radio communication function section 104 is in radio communication or not before executing an infrared communication operation (Step S602).

When the radio communication function section 104 is not in radio communication (Step S602: No), the information processing section 101 executes the infrared communication function by the first infrared communication function section 102 (Step S606). No restriction is given to the driving current of the light emitting element in the first infrared communication function section 102.

When the radio communication function section 104 is in radio communication (Step S602: Yes), the information processing section 101 judges the transmission power value of the radio communication function section 104 based on information from a transmission power control section 206.

When the transmission power value is lower than a predetermined first threshold (Step S603: No), the information processing section 101 executes infrared communications using the second infrared communication function section 501 (Step S605) and, at a same time, an output device 108 notifies to a person having the portable radio terminal that a communicable distance of the infrared communications is restricted (Step S607). A restriction is given to the driving current of the light emitting element in the second infrared communication function section 501.

When the transmission power value is higher than the predetermined first threshold (Step S603: Yes), the information processing section 101 executes infrared communications using the third infrared communication function section 502 (Step S604) and, at a same time, the output device 108 notifies to the person having the portable radio terminal that a communicable distance of the infrared communications is restricted (Step S607). A further restriction is given to the driving current of the light emitting element in the third infrared communication function section 502 rather than the second infrared communication function section 501.

In this way, the infrared communication function is selected, the selected infrared communication operation is executed and the infrared communication operation is finished (Step S608).

It is thus apparent that the present invention is not limited to the above embodiments but may be changed and modified without departing from the scope and spirit of the invention.

Finally, the present application claims the priority based on Japanese Patent Application No. Heill-235009 filed on Aug. 23, 1999, which is herein incorporated by reference.

What is claimed is:

1. A communication method for a portable radio terminal with an infrared communication function comprising:
a radio communication function section;
an infrared communication function section; and
an information processing section operable to detect a function state of said radio communication function section and operable to control an infrared output from said infrared communication function section,
wherein said function state indicates whether there is radio output from said radio communication function section, and
wherein the infrared output from said infrared communication function section is restricted when the information processing section detects a function state indicating there is radio output from said radio communication function section.

2. A portable radio terminal with an infrared communication function comprising:
a radio communication function section;
an infrared communication function section; and
an information processing section operable to detect a function state of said radio communication function section and operable to control an infrared output from said infrared communication function section,
wherein said function state indicates whether there is radio output from said radio communication function section, and
wherein the infrared output from said infrared communication function section is not restricted when the information processing section detects a function state indicating there is no radio output from said radio communication function section.

3. The portable radio terminal with an infrared communication function according to claim 2, wherein the infrared output from said infrared communication function section is restricted when the information processing section detects a function state indicating there is radio output from said radio communication function section.

4. A portable radio terminal with an infrared communication function comprising:
a radio communication function section;
an infrared communication function section; and
an information processing section operable to detect a function state of said radio communication function section and operable to control an infrared output from said infrared communication function section,
wherein said function state indicates whether there is radio output from said radio communication function section, and
wherein said infrared output is controlled so as to restrict a communicable distance of said infrared communication function when said function state indicates radio output from said radio communication function section.

5. A communication method for a portable radio terminal with an infrared communication function, said communication method comprising:
judging whether a radio communication function section is in radio communication or not; and
selecting an infrared communication function section among a plurality of infrared communication function sections,
wherein a user is notified that a communicable distance of said infrared communication function is restricted when the radio communication function section is in radio communication.

6. The communication method for a portable radio terminal with an infrared communication function according to claim 5, wherein said infrared communication function section is selected among said plurality of infrared communication function sections in accordance with a transmission power value of said radio communication function section.

7. The communication method for a portable radio terminal with an infrared communication function according to claim 5, wherein a driving current of a light emitting element is not restricted when the radio communication function is not in radio communication.

8. The communication method for a portable radio terminal with an infrared communication function according to claim 7, wherein the driving current of the light emitting element is restricted when the radio communication function is in radio communication.

9. The communication method for a portable radio terminal with an infrared communication function according to claim 5, wherein a driving current of a light emitting element is restricted when the radio communication function is in radio communication.

10. A communication method for a portable radio terminal with an infrared communication function, said communication method comprising:
judging whether a radio communication function section is in radio communication or not; and controlling a driving current of a light emitting element in an infrared communication function section;

wherein a user is notified that a communicable distance of said infrared communication function is restricted when the radio communication function section is in radio communication.

11. The communication method for a portable radio terminal with an infrared communication function according to claim 1, wherein said driving current of said light emitting element in said infrared communication function section is controlled in accordance with a transmission power value of said radio communication function section.

12. The communication method for a portable radio terminal with an infrared communication function according to claim 1, wherein the driving current of the light emitting element is not restricted when the radio communication function is not in radio communication.

13. The communication method for a portable radio terminal with an infrared communication function according to claim 12, wherein the driving current of the light emitting element is restricted when the radio communication function is in radio communication.

14. The communication method for a portable radio terminal with an infrared communication function according to claim 1, wherein the driving current of the light emitting element is restricted when the radio communication function is in radio communication.

* * * * *